US009575347B2

(12) United States Patent
Zhang et al.

(10) Patent No.: US 9,575,347 B2
(45) Date of Patent: Feb. 21, 2017

(54) BASE MATERIAL FOR DISPLAY DEVICE, DISPLAY DEVICE AND METHOD FOR FABRICATING THE SAME

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Qing Zhang, Beijing (CN); Hongqiang Luo, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/744,484

(22) Filed: Jun. 19, 2015

(65) Prior Publication Data
US 2016/0170257 A1    Jun. 16, 2016

(30) Foreign Application Priority Data

Dec. 11, 2014 (CN) .......................... 2014 1 0764450

(51) Int. Cl.
*G02F 1/1333* (2006.01)
*B32B 7/12* (2006.01)
(Continued)

(52) U.S. Cl.
CPC ........... *G02F 1/133308* (2013.01); *B32B 3/30* (2013.01); *B32B 7/12* (2013.01); *B32B 37/003* (2013.01);
(Continued)

(58) Field of Classification Search
CPC .............. B32B 37/12; B32B 7/12; B32B 3/30; B32B 2457/202; B32B 37/1284; G02F 1/133308
See application file for complete search history.

(56) References Cited

U.S. PATENT DOCUMENTS 5,742,006 A * 4/1998 Grupp ................... G02F 1/1339
174/525
2009/0237775 A1* 9/2009 Ito .......................... G02F 1/1339
359/296
(Continued)

FOREIGN PATENT DOCUMENTS

CN          1560689 A        1/2005
CN          101382690 A      3/2009
(Continued)

OTHER PUBLICATIONS

First Chinese Office Action dated Oct. 8, 2016; Appln. No. 201410764450.8.

*Primary Examiner* — James Dudek
(74) *Attorney, Agent, or Firm* — Ladas & Parry LLP

(57) ABSTRACT

A base material for a display device, a display device and a method for fabricating the display device are disclosed. One or more grooves are disposed on a bonding surface of the base material, the grooves are configured for accommodating at least a portion of adhesive coated to the bonding surface. The grooves on the base material can accommodate redundant adhesive, thereby effectively preventing the adhesive overflow and air bubble defects during the bonding process, and increasing the yield ratio of bonding.

17 Claims, 3 Drawing Sheets

(51) Int. Cl.
*B32B 3/30* (2006.01)
*B32B 37/00* (2006.01)
*B32B 37/12* (2006.01)

(52) U.S. Cl.
CPC ...... *B32B 37/1284* (2013.01); *B32B 2457/202* (2013.01); *G02F 2001/133331* (2013.01)

(56) References Cited

U.S. PATENT DOCUMENTS

| | | | | |
|---|---|---|---|---|
| 2014/0118640 | A1* | 5/2014 | Chen | G02F 1/133308 349/12 |
| 2014/0293573 | A1* | 10/2014 | Kang | H05K 7/02 362/19 |
| 2015/0138466 | A1* | 5/2015 | Mori | G11C 19/287 349/38 |

FOREIGN PATENT DOCUMENTS

| | | |
|---|---|---|
| CN | 101418916 A | 4/2009 |
| CN | 103531095 A | 1/2014 |
| CN | 203480171 U | 3/2014 |

\* cited by examiner

BASE MATERIAL FOR DISPLAY DEVICE, DISPLAY DEVICE AND METHOD FOR FABRICATING THE SAME

FIELD OF THE ART

Embodiments of the invention relate to a base material for a display device, a display device and a method for fabricating the display device.

BACKGROUND

As the newest input devices, touch screens are the easiest, the most convenient and the most natural means for human-machine interaction, and have enormous development potential. A touch screen typically comprises: a touch element for implementing the touch function, a liquid crystal device (LCD) panel for implementing the display function, and a protective cover glass. The touch element may be fabricated on the base substrate to form a separate touch screen, and then the touch screen is bonded to the LCD panel and the cover glass. Alternatively, the touch element may be fabricated on the cover glass directly, and then the cover glass is bonded to the LCD panel. As another alternative, the touch element may be disposed in the LCD panel, and then the cover glass is bonded to the LCD panel. Any of the above structures need to bond the cover glass to parts such as LCD panels in the end, and such a step is referred to as the bonding process. If optic clear resin (OCR) adhesives are employed in the bonding process, the adhesives are generally coated by way of slit coating. As illustrated in FIG. 1, a slit nozzle 12 sprays the OCR while moves from left to right relative to a cover glass 10, thus forming an OCR coating 11 with good flatness on a bonding surface of the cover glass 10. However, comparing with the middle stage of the coating process, the coating speed at the starting and ending stages of the coating process are relatively slow. Due to the residence of liquid, the thicknesses of the starting and the ending parts of the OCR coating are much larger than that the middle part, easily causing air bubbles to be generated and difficulties in controlling the adhesive overflow, thereby decreasing the free-defect ratio of bonding.

SUMMARY

A first aspect of the invention provides a base material for a display device, wherein one or more grooves are disposed on a bonding surface of the base material, the grooves are configured for accommodating at least a portion of adhesive coated to the bonding surface.

A second aspect of the invention provides a display device comprising the above base material.

A third aspect of the invention provides a method for fabricating a display device, comprising a step of bonding a base material to a display panel, wherein one or more grooves for accommodating adhesive are disposed on a bonding surface of the base material, the grooves are configured for accommodating at least a part of the adhesive coated to the bonding surface.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

NUMERAL REFERENCES

10—cover glass, 11—OCR coating, 12—slit nozzle, 20—base material, 21—groove.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a base material for a display device, and one or more grooves are disposed on a bonding surface of the base material. The grooves are configured for preventing bonding defects caused by uneven coating of the adhesives.

During the fabricating process of display devices, it is often necessary to bond optical-grade base materials. If there are problems such as uneven coating or different shapes of bonding surfaces (mismatch of bonding surfaces) and the like during the bonding process, it may easily cause air bubbles and difficulties in controlling the adhesive overflow during bonding, thereby decreasing the yield ratio of bonding and compromising the display effect. In accordance with an embodiment of the invention, one or more grooves are disposed on the bonding surface of the base material to be bonded, and the grooves can accommodate redundant adhesives (or adhesive layers) during bonding, thus reducing the difficulty in controlling the adhesive overflow, thereby increasing the bonding quality. Moreover, different shapes can be bonded together through disposing grooves on the bonding surface.

In summary, through disposing grooves on necessary positions on the bonding surface of the base materials, it is possible to bond different shapes and to prevent air bubbles and adhesive overflow during the bonding process, thereby increasing the yield ratio of bonding. The "necessary position" includes but is not limited to positions on which there are redundant adhesives or air bubbles after the bonding process, as long as disposing grooves on such positions can improve the bonding quality through analyses or experiments. Moreover, specific disposing positions of the grooves and shapes, depths, widths and pitches of the same can be designed by those skilled in the art according to the actual situation.

Figure 1:
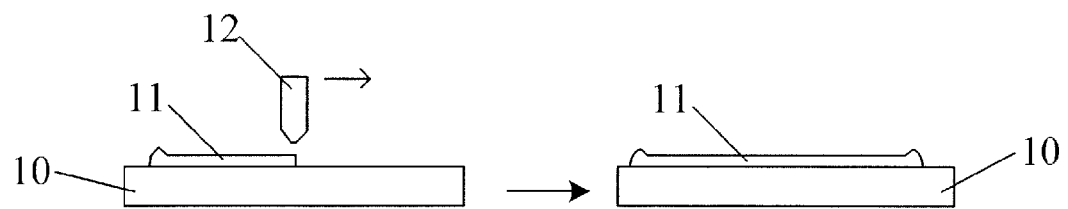
FIG. 1 schematically illustrates a coating process on a cover glass by way of slit coating in conventional technology.
Figure 2:
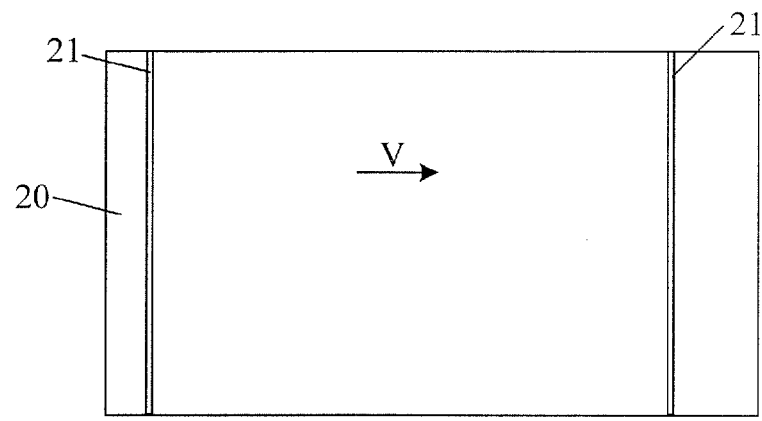
FIG. 2 schematically illustrates a plan view of a base material according to an embodiment of the invention.
Figure 3:
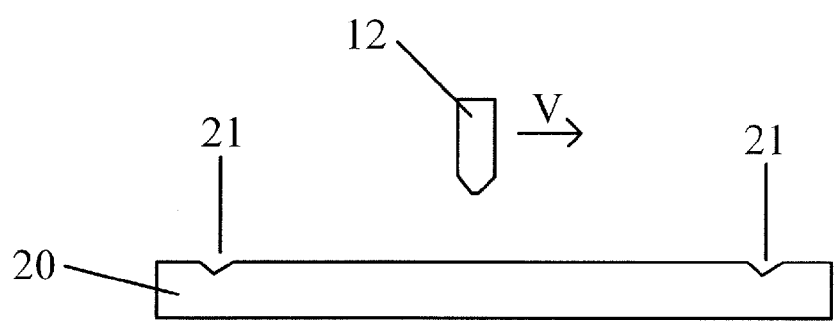
FIG. 3 schematically illustrates a cross section view of the base material of FIG. 2.

A base material 20 for a display device in accordance with an embodiment of the invention is illustrated in FIGS. 2 and 3. Two grooves 21 are disposed on the bonding surface of the base material 20, and a length direction of the grooves is perpendicular to the coating direction (arrowhead direction as illustrated in the drawings) of the coating process, thereby being more advantageous to prevent the bad control of adhesive overflow due to the uneven coating. The V in the drawings represents the coating speed.

As an example, two grooves 21 are disposed at both ends of the base material 20. The two ends of the base material 20 generally correspond to starting position and ending position of the coating process. If slit coating is used as the coating process, the starting and ending stages of the coating respectively correspond to accelerating and decelerating stages, the coating speeds of which are relatively slow comparing with constant speed of the middle stage. Therefore the thicknesses of adhesives on the both ends (i.e., starting end and ending end) are much larger than that of the middle part due to the residence of liquids, easily causing adhesive overflow. Due to the above fact, grooves are preferably disposed at both ends of the base material. For example, the positions of the two grooves 21 on the base material 20 correspond to the starting position and ending position of the coating process.

Figure 4:
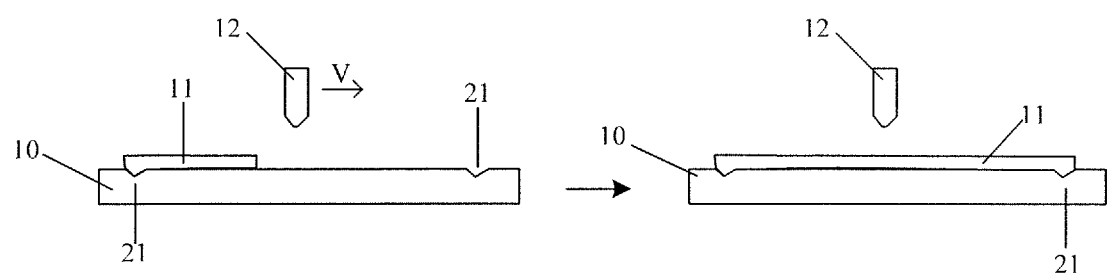
FIG. 4 schematically illustrates an coating process on the base material of FIG. 3 which is used as a cover glass.

As illustrated in FIG. 4, when a base material 20 is used as a cover glass 10, grooves 21 are designed on a bonding surface of the cover glass 10, and the positions of the two grooves 21 are designed to correspond to the starting position and ending position of the OCR coating 11. It can be understood that, the specific number and depth of the grooves 21 are designed for the purpose of forming the OCR coating 11 with a uniform thickness. The number of grooves can be one or more than two in another embodiment of the invention.

Moreover, it can be understood that, as another implementation of the invention, the grooves can also be disposed on another part which is bonded to the cover glass 10 such as the bonding surface of LCD panel. However the technical difficulty of such an implementation is relatively large, and may easily damage the LCD panel.

The positions of the grooves 21 on the base material 20 correspond to non-uniform motion stage of the coating process, thus preventing the inconformity of thickness of adhesives respectively during the uniform motion stage and the non-uniform motion stage, thereby reducing the difficulty of controlling the adhesive overflow and increasing the bonding quality.

Figure 5:
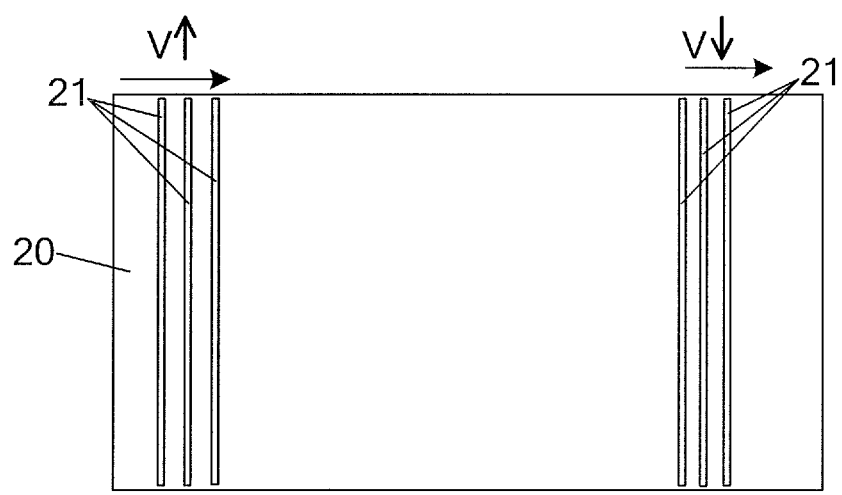
FIG. 5 schematically illustrates a plan view of a base material in accordance with another embodiment of the invention.
Figure 6:
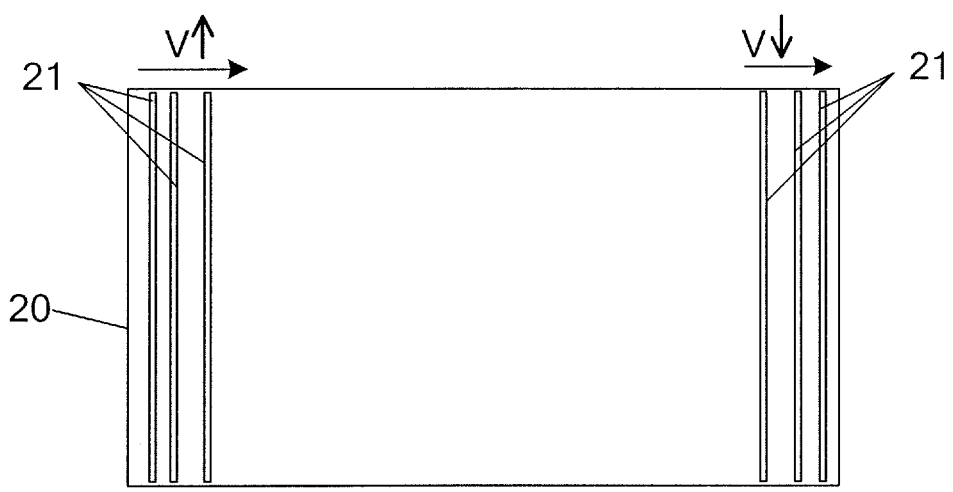
FIG. 6 schematically illustrates a plan view of a base material in accordance with yet another embodiment of the invention.

Another two base materials in accordance with embodiments of the invention are as illustrated in FIGS. 5 and 6, respectively. A plurality of grooves 21 are disposed on bonding surface of both base materials, for example, six grooves are disposed. As illustrated in FIG. 5, a coating direction is from left to right, a starting stage (corresponding to the left end of the base material 20) is the accelerating stage, and depths of the grooves 21 decrease gradually from left to right; an ending stage (corresponding to the right end of the base material 20) is the decelerating stage, and depths of the grooves 21 increase gradually from left to right. As illustrated in FIG. 6, a coating direction is also from left to right, and the pitches of a plurality of grooves disposed at the left end of the base material 20 gradually increase along a direction along which the coating speed increases (from left to right), that is, the pitches or distribution densities of the grooves gradually decrease along the direction which the coating speed increases.

It can be seen from FIGS. 5 and 6 that when a plurality of grooves are disposed on the base material, at least one of the depth and the distribution density (or pitch) of the plurality of grooves decreases gradually along a direction where the coating speed increases, thus being more advantageous to the uniformity and flatness of the coating, thereby increasing the bonding quality. However, it is improper to dispose too many grooves, since they might affect the final display effect.

In at least one of embodiments of the invention, locations of the grooves on the base material correspond to locations of black matrix in the display device, thus preventing affecting final display effect due to the disposed grooves.

In at least one of embodiments of the invention, at least some of the grooves 21 extend to the edge of the adhesive layer instead of the edge of the base material, thus preventing the adhesive from outflowing to the sides of the base material during the bonding process.

Figure 7:
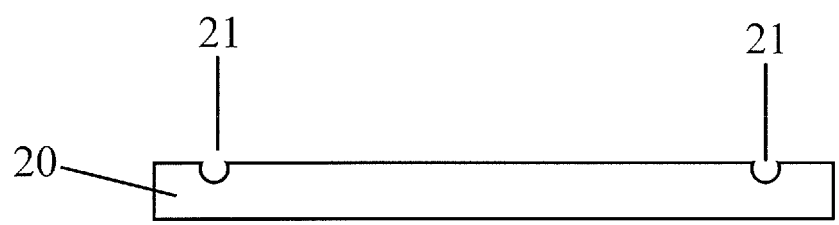
FIG. 7 schematically illustrates a cross section of a base material in accordance with still another embodiment of the invention.

The cross section of the grooves may be of any shapes. In at least one of the embodiments of the invention, the cross section of the grooves can be of a shape such as a trapezoid, a semicircle or a rectangle and the like. As an example, as illustrated in FIG. 7, the cross section of the grooves 21 is narrower at the upper part and wider at the lower part, thus accommodating more adhesive materials and reducing the aperture area of the base material as far as possible, thereby preventing affecting the display due to the existence of the grooves.

Figure 8:
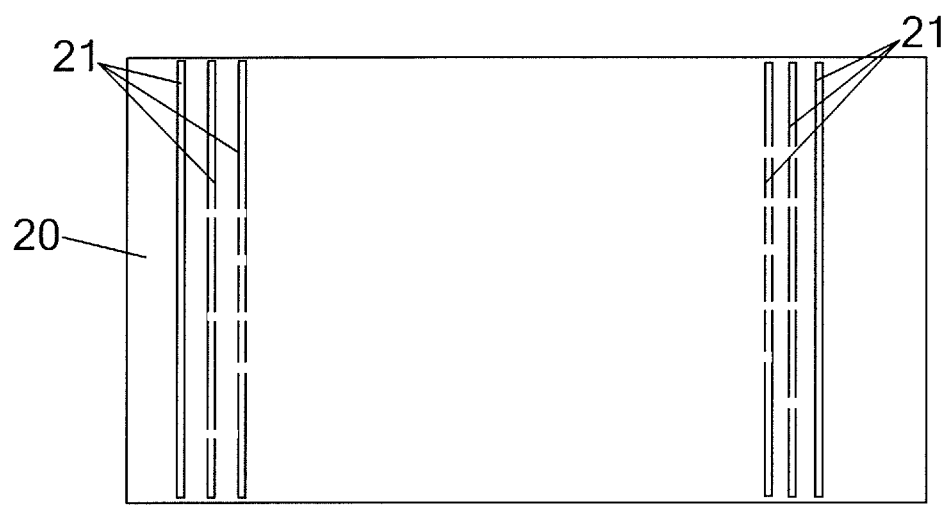
FIG. 8 schematically illustrates a plan view of a base material in accordance with another embodiment of the invention.

The grooves may be continuous or discontinuous. As illustrated in FIG. 8, at least some of grooves 21 are disposed discontinuously.

The novel base material provided by the embodiment of the invention disposes grooves at necessary positions on the bonding surface of the base material, which makes it is possible to implement different shapes bonding and to effectively prevent adhesive overflow and air bubble defects during the bonding process, thereby increasing the yield ratio of bonding. The base material is applicable to any bonding scenario, and not limited to display devices. The base material provided in the embodiment of the invention comprises but is not limited to the protective cover glass in the display device. For example, it may also be a base material employed during the fabricating process of optical device such as an optical lens and the like.

An embodiment of the invention further provides a display device which makes use of any of the above base materials. As the novel base material provided in the embodiment of the invention is employed in the display device, the bonding quality is higher, thereby achieving a higher display quality. The display device can be a LCD display panel, an E-paper, an OLED panel, a mobile phone, a tablet PC, a television, a display, a laptop computer, a digital photo-frame, a navigator or any products or components with a display function.

An embodiment of the invention further provide a method for fabricating a display device, comprising: a step of bonding a base material to a display panel, wherein one or more grooves for accommodating adhesive are disposed on a bonding surface of the base material.

As an example, the above step of bonding comprises:

forming one or more grooves on the bonding surface of the base material for preventing bonding defects; and coating the adhesive to the bonding surface to form an adhesive layer, wherein at least a portion of the adhesive fills into the one or more grooves; and bonding the base material and the display panel by using the adhesive layer.

In accordance with the method provided in the embodiment of the invention, the grooves which accommodate redundant adhesive are formed on the surface of the base material, thus preventing adhesive overflow and the air bubble defects during the bonding process, thereby increasing the yield ratio of bonding. As a result, the product is of a lower cost of product and a higher display quality.

In an embodiment of the invention, one or more grooves are disposed on a bonding surface of the base material to be bonded. The grooves can accommodate redundant adhesives and air bubbles generated during the coating process. Through disposing the grooves at the necessary positions (i.e., the positions which the redundant adhesives exist or the air bubbles easily generated at) of the bonding surface of the base material, it is possible to bond different shapes, and to effectively prevent the adhesive overflow and air bubble defects during the bonding process, thereby increasing the yield ratio of bonding.

What is described above is related to the illustrative embodiments of the disclosure only and not limitative to the scope of the disclosure; the scopes of the disclosure are defined by the accompanying claims.

This application claims the priority of Chinese Patent Application No. 201410764450.8, filed on Dec. 11, 2014, and which application is incorporated herein by reference.

What is claimed is:

1. A base material for a display device, wherein one or more grooves are disposed on a bonding surface of the base material, the grooves are configured for accommodating at least a portion of adhesive coated to the bonding surface; wherein a plurality of grooves are disposed on the bonding surface of the base material, and at least one of a depth and a distribution density of the plurality of grooves decreases gradually along a direction where coating speed increases.

2. The base material of claim 1, wherein the adhesive is coated to the bonding surface of the base material along a coat direction, and a length direction of the grooves is perpendicular to the coating direction.

3. The base material of claim 1, wherein the grooves are disposed at both ends of the base material.

4. The base material of claim 1, wherein at least a portion of the adhesive is filled into the grooves during a non-uniform motion coating stage.

5. The base material of claim 4, wherein locations of the grooves on the base material correspond to starting position and ending position of the coat.

6. The base material of claim 1, wherein the adhesive forms an adhesive layer and the grooves extend to an edge of the adhesive layer.

7. The base substrate of claim 1, wherein locations of the grooves on the base material correspond to locations of black matrix in the display device.

8. The base material of claim 1, wherein a cross section of the grooves is narrower at upper part and wider at lower part.

9. The base material of claim 1, wherein the grooves are discontinuous.

10. The base material of claim 1, wherein the base material is a protective cover plate of the display device.

11. A display device comprising the base material of claim 1.

12. The display device of claim 11, further comprising a liquid crystal display panel, wherein the base material is a cover plate, and the cover plate is bonded to the liquid crystal display panel.

13. A method for fabricating a display device, comprising a step of bonding a base material to a display panel, wherein one or more grooves configured for accommodating adhesive are disposed on a bonding surface of the base material, the grooves are configured for accommodating at least a part of the adhesive coated to the bonding surface;

wherein a plurality of grooves are disposed on the bonding surface of the base material, and at least one of a depth and a distribution density of the plurality of grooves decreases gradually along a direction where coating speed increases.

14. The method of claim 13, the step of bonding the base material to the display panel comprises:

forming one or more grooves on the bonding surface of the base material;

coating the adhesive to the bonding surface to form an adhesive layer, wherein at least a portion of the adhesive fills into the one or more grooves; and bonding the base material and the display panel by using the adhesive layer.

15. The base material of claim 13, wherein the adhesive is coated to the bonding surface of the base material along a coat direction, and a length direction of the grooves is perpendicular to the coating direction.

16. The base material of claim 13, wherein at least a portion of the adhesive is filled into the grooves during a non-uniform motion coating stage.

17. The base material of claim 16, wherein locations of the grooves on the base material correspond to starting position and ending position of the coat.

* * * * *